US008224798B2

(12) United States Patent
Schofield

(10) Patent No.: US 8,224,798 B2
(45) Date of Patent: Jul. 17, 2012

(54) REDUCING THE NUMBER OF OPERATIONS PERFORMED BY A PERSISTENCE MANAGER AGAINST A PERSISTENT STORE OF DATA ITEMS

(75) Inventor: Andrew John Schofield, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 1654 days.

(21) Appl. No.: 11/260,062

(22) Filed: Oct. 27, 2005

(65) Prior Publication Data

US 2006/0101006 A1     May 11, 2006

(30) Foreign Application Priority Data

Nov. 5, 2004   (GB) .................................. 0424489.3

(51) Int. Cl.
*G06F 7/00* (2006.01)
*G06F 17/00* (2006.01)
(52) U.S. Cl. ........................................ 707/703; 707/705
(58) Field of Classification Search .................. 707/687, 707/703, 705
See application file for complete search history.

(56) References Cited

U.S. PATENT DOCUMENTS 6,219,750 B1 *  4/2001  Kanamaru et al. ............ 711/113
6,990,503 B1 *  1/2006  Luo et al. ....................... 707/200
2003/0191782 A1 * 10/2003  Buxton et al. ................. 707/202
2004/0039742 A1 *  2/2004  Barsness et al. ................ 707/10

OTHER PUBLICATIONS

Boukerche, A., Tuck, T.W. "T3C: A Temporally Correct Concurrency Control Algorithm for Distributed Databases," Sep. 1, 2000.*
"Asynchronous Commit," www.ip.com0031629D, 1 pg.
"SuperSpeed," www.raxco.be/pages/info/SuperSpeed-Cache/supercache.htm, 4 pgs.
Webber, Jim, "Future Directions for Web Transactions", HP Presentation, 21 pgs.
"OASIS, Business Transaction Protocol," version 1.0.0.4, BTP 1.1 Working Draft 04 Oct. 26, 2004.
"PTF Memo for : IBM WebSphere MQ for AIX Version 5.3 Service Level 5.3.0.9 (Fix Pack CSD09)," International Business Machines Corporation, 1995, 2004.

* cited by examiner

*Primary Examiner* — Marc Somers
(74) *Attorney, Agent, or Firm* — Winstead, P.C.

(57) ABSTRACT

Method, apparatus, and computer program product for reducing the number of operations performed by a persistence manager against a persistent store of data items. A plurality of requests from an application are received. Each request is mapped into a transaction for performance against the persistent store, each transaction having at least one operation. Transactions are accumulated and preprocessed to reduce the number of operations for performance against the persistent store.

9 Claims, 4 Drawing Sheets

REDUCING THE NUMBER OF OPERATIONS PERFORMED BY A PERSISTENCE MANAGER AGAINST A PERSISTENT STORE OF DATA ITEMS

FIELD OF THE INVENTION

The present invention relates to transactional data processing systems such as messaging or database systems, and more particularly to reducing the number of interactions between such a system and a persistent store.

BACKGROUND OF THE INVENTION

In a data-processing system that manages items of data in a persistent store, a significant performance cost is often incurred for each interaction between the data-processing system and the persistent store. The storage medium in question may be a magnetic disk drive accessed directly using the operating system, a relational database or system, or some other persistence mechanism.

Typically, an application issues requests to a data processing system which are then mapped to operations for effecting work against a persistent store. Such operations are grouped into transactions which are each committed to the persistent store. At the point a transaction is committed, the system can guarantee to the application that all the operations necessary to satisfy an application's request are complete.

Since interactions with the persistent store are expensive, especially interactions that commit transactions, the concept of a group commit is also known. A group commit delays interaction with the persistent store to amortize the cost of the interaction across a number of transactions. This capability reduces the performance cost somewhat. Nevertheless there is the opportunity for a more effective mechanism for improving performance in some environments.

Note that optimizations are known at recovery time. For example, published U.S. patent application 20030191782 discloses replaying a log starting with the most recent log record. It is then determined for each successive log record that relates to an operation on a database record, whether processing the log record will result in the most recent state of the corresponding database record, and if so, the log record is processed. Subsequently, additional data is restored from the backup. This patent application does not, however, address performance issues during normal operation.

SUMMARY OF THE INVENTION

According to a first aspect, there is provided a method for reducing the number of operations performed by a persistence manager against a persistent store of data items, the method comprising: receiving a plurality of requests from an application; mapping each request into a transaction for performance against the persistent store, each transaction comprising at least one operation; accumulating a plurality of transactions; and preprocessing the plurality of transactions to reduce the number of operations for performance against the persistent store.

As alluded to above, writing to a persistent store can be expensive. The invention provides a way of reducing the number of operations performed by a persistence manager against a persistent store and consequently goes some way to alleviating this cost.

In a preferred embodiment, a list of dispatch units is maintained, each dispatch unit containing information about each transaction, including state information. This list is then used to determine whether a transaction state change can be omitted. If this is the case, then it is preferably determined how the omission of a transaction state change affects the overall transaction. The transaction is then modified in accordance with the determination; for example, the state of the transaction may be changed.

In accordance with a preferred embodiment, it is determined which of the dispatch units may be batched together, and such units are then batched accordingly. This may involve including dispatch units up to a maximum number in a batch.

Preferably, it is determined whether a dispatch unit is dispatchable, and it is included in a batch if it is dispatchable. Preferably, it is determined that a dispatch unit is not dispatchable due to a data item conflict, wherein the data item conflict is as a result of a dispatch unit already in a batch under construction. This dispatch unit is then preferably included in the dispatch unit in the batch under construction.

In accordance with a preferred embodiment, a batch is analyzed, and this analysis is used to determine which operations may be canceled from a batch. Such operations are then canceled. Cancellation may include canceling a complete dispatch unit.

Preferably dispatch units are dispatched to the persistence manager for performance against the persistent store.

According to a second aspect, there is provided an apparatus for reducing the number of operations performed by a persistence manager against a persistent store of data items, the apparatus comprising: a receiving component for receiving a plurality of requests from an application; a mapping component for mapping each request into a transaction for performance against the persistent store, each transaction comprising at least one operation; an accumulating component for accumulating a plurality of transactions; and a preprocessing component for preprocessing the plurality of transactions to reduce the number of operations for performance against the persistent store.

It will be appreciated that the present invention may be implemented in computer software.

BRIEF DESCRIPTION OF THE DRAWINGS

A preferred embodiment of the present invention will now be described, by way of example only, and with reference to the following drawings, wherein.

DETAILED DESCRIPTION

Due to the frequently significant cost of interaction by a transactional data processing system with a persistent store, it is not always possible to achieve adequate performance by synchronous use of such a store. This is true in, for example, a system in which new data items are short-lived and the throughput is high, such as a messaging system. In such an environment it may be acceptable to trade some transactionality for increased performance.

There is a risk that entire (but not partial) transactions may be lost in the case of failures. Nevertheless, depending on the type of data being processed by the system, this is a risk that a user may be willing to accept in order to improve the throughput of the system.

Figure 1:
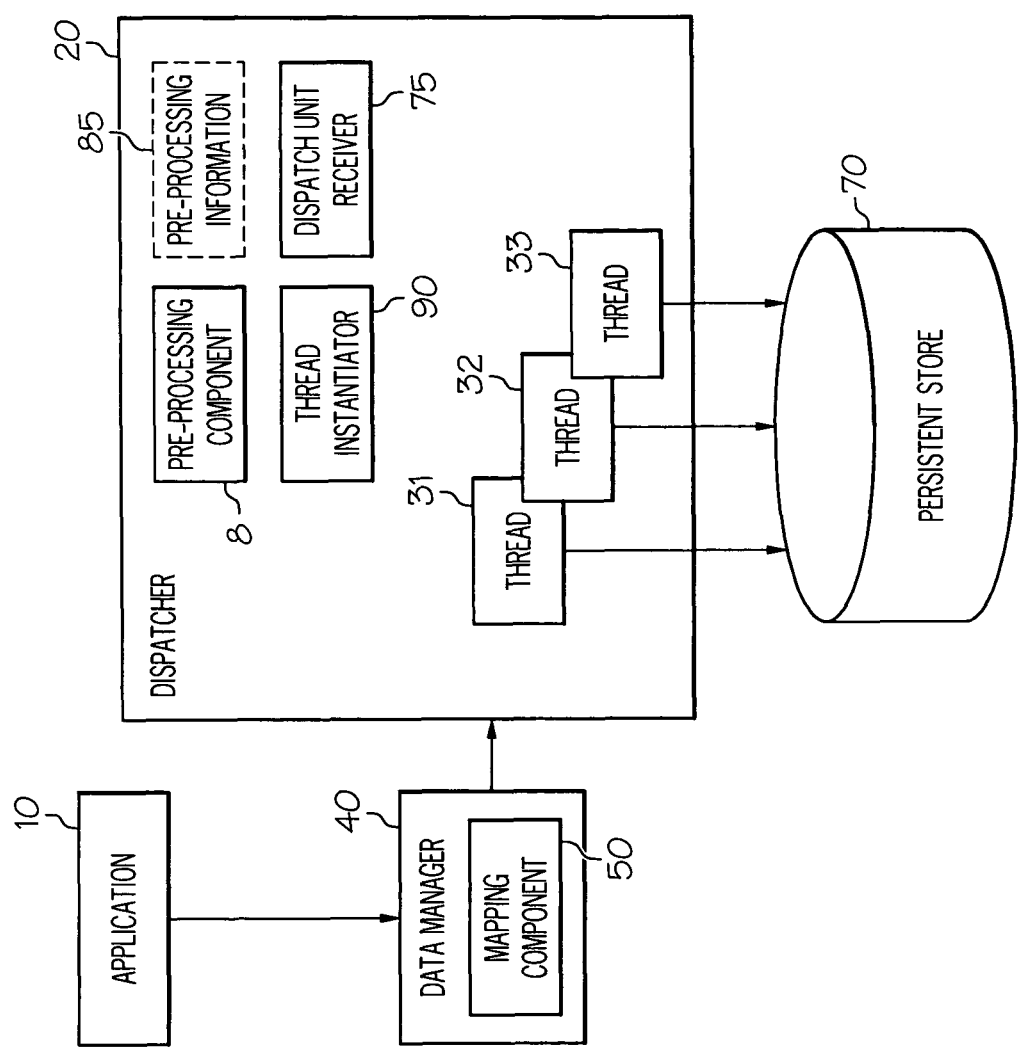
FIG. 1 is a component diagram of the present invention in accordance with a preferred embodiment.
Figure 2:
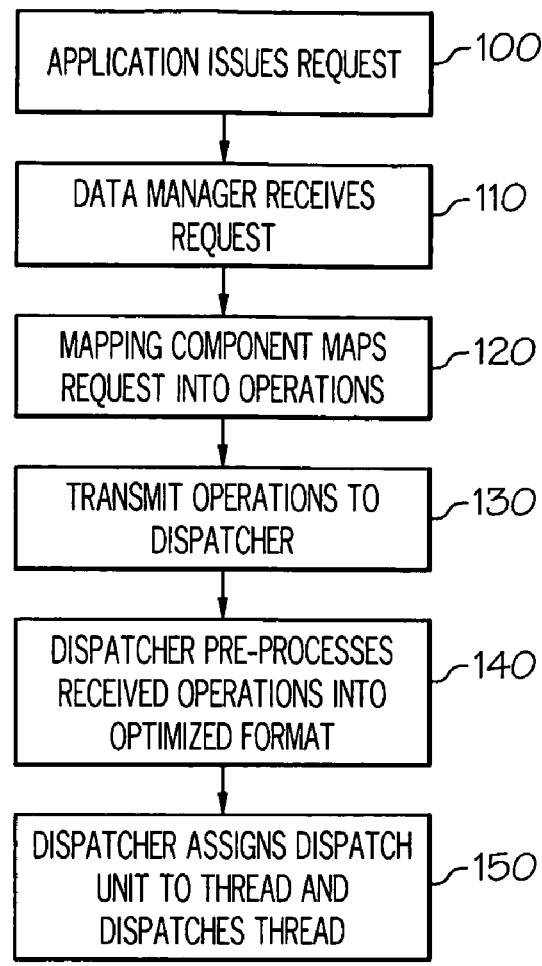
FIG. 2 illustrates the processing of the present invention in accordance with a preferred embodiment of the present invention.

FIG. 1 shows the components of a preferred embodiment of the present invention. FIG. 2 is a flow chart of the processing of the present invention in accordance with a preferred embodiment. The two figures should be read in conjunction with one another.

An application 10 issues a request to a data processing system 60 (step 100). The request is received at the data processing system by a data manager 40 and is mapped by a mapping component 50 into a series of operations necessary to achieve the application's initial request (step 110, 120). In a database system such operations may be inserts, updates, and deletes of rows in a table. A messaging system's operations are likely to be puts and gets of messages.

The data manager transmits operations to the dispatcher 20 as dispatch units (step 130). These are received by receiver component 75 and preprocessed prior to accessing persistent store 70 (step 140). In more detail, a dispatch unit comprises a transaction's set of operations against data items held by persistent store 70, together with a change in state of the transaction such as from 'prepared' to 'committed' as part of the processing of a two-phase commit. It is when a transaction goes through a state change, that the data manager transmits a dispatch unit for the transaction's state change to dispatcher 20 (step 130).

Dispatch units are preprocessed via preprocessor component 80 which uses preprocessing information 85 to derive an optimized form of the data. Optimizations, with the exception of a simple combination of operations into batches, are possible because of the loosening of transactions semantics to allow the persistent store to be accessed asynchronously.

The dispatcher 20 also manages a group of several threads (31, 32, 33, although there are not necessarily exactly three) whose purpose is to interact with persistent store 70. Such interactions preferably achieve the application's requests via performance of the operations contained in the dispatch units.

The dispatcher assigns dispatch units to threads and dispatches the threads to perform the work for the dispatch units assigned to them (step 150). Once the threads have completed the work, they are classed as dispatched, and the dispatcher updates the preprocessing information 85 to remove the completed work. This will be discussed later.

By way of example, the data processing system may be a bank, and the request from the application might be to create a bank account held on persistent store 70.

Figure 3:
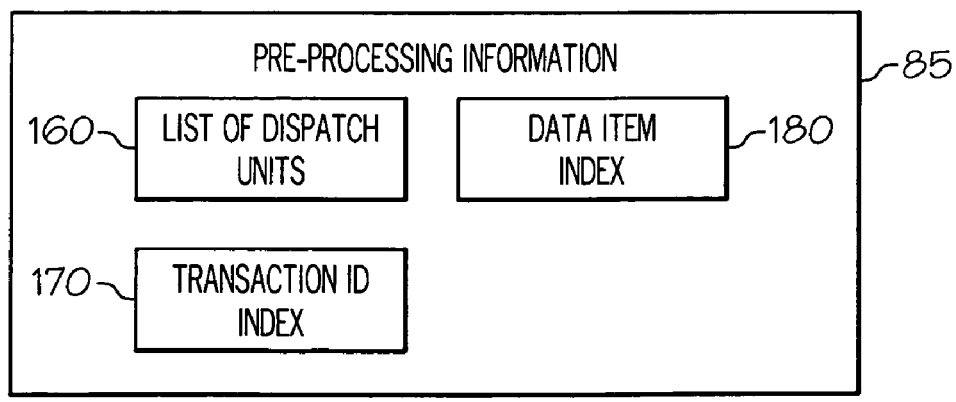
FIG. 3 depicts preprocessing information in accordance with a preferred embodiment of the present invention.

FIG. 3 outlines the preprocessing information 85 used by the preprocessing component. As previously discussed, operations are received by receiver components as dispatch units. Each item of data in persistent store 70 has a unique identifier. Each transaction also has a unique identifier. Each dispatch unit comprises a set of operations on data items in persistent store 70 and a state change of the associated transaction.

The preprocessing information comprises a list of received dispatch units (160), an index of the dispatch units by transaction identifier (170), and an index of the dispatch units by the identifiers of the data items involved in the transactions (180). Note that, for ease of explanation, FIG. 3 shows separate lists (indices). However, in reality these are actually different views of the same physical data.

The list of dispatch units 160 will now be discussed in more detail. The following notation is used to describe the optimizations. The letter 'i' denotes the identifier of a data item, and the symbol 'Tn' denotes the identifier of a transaction.

The operations on data items in the persistent + are denoted as follows:

TABLE 1

| Symbol | Meaning |
| --- | --- |
| Ii | operation which creates the persistent representation of the item i |
| Ui | operation which updates the persistent representation of the item i |
| Di | operation which deletes the persistent representation of the item i |

Each dispatch unit is associated with a transaction state change denoted as follows:

TABLE 2

| Symbol | Current state | New state |
| --- | --- | --- |
| TnC1 | Active | Committed (one-phase) |
| TnP | Active | Prepared to commit |
| TnC | Prepared to commit | Committed |
| TnR | Prepared to commit | Rolled back |
| TnCd | Committed | Committed |
| TnRd | Rolled back | Rolled back |

Note that there is no symbol TnR1 since the transition from the 'active' to the 'rolled back' state can be achieved without needing to update the persistent store at all. This is because no operations are applied to the persistent store for a transaction while it is actually in the 'active' state and there is therefore nothing which needs to be undone.

Received dispatch units are used to create the list 160. The table below illustrates an example dispatch list in which each row in the diagram corresponds to a single dispatch unit and where dispatch units are shown in order of increasing time of presentation to the dispatcher:

TABLE 3

| Transaction ID & State | Operation | Operation | Operation | Operation | Operation | Dispatchable? |
| --- | --- | --- | --- | --- | --- | --- |
| T1C1 | [I1] | | [I3] | | | Y |
| T2P | [U1] | [I2] | | | | N (1) |
| T3C1 | | | [U3] | [I4] | | N (3) |
| T2C | [U1] | [I2] | | | | N (1, 2) |
| T4C1 | | [U2] | | | | N (2) |
| T5C1 | | | [D3] | | | N (3) |
| T6C1 | | [D2] | | [D4] | | N (2, 4) |
| T7P | | | | | [I5] | Y |
| T7R | | | | | [I5] | N (5) |
| T8C1 | [D1] | | | | | N (1) |

As can be seen from the above table, there are 10 dispatch units in the list, referring to 8 transactions. Transaction T1 comprises two operations: an insert of data item 1 and an insert of data item 3 (see table 1). From the transaction ID & state column, it can be seen that the first dispatch unit represents the change of transaction T1 from the 'active' state to the 'committed' state (see table 2). Transaction T2 updates data item 1 and inserts data item 2. There are two dispatch units in the table for this transaction, one for the state change from 'active' to 'prepared', and a second for the state change from 'prepared to commit' to 'committed'. Similarly, there are two dispatch units in the table for transaction T7 as it is first prepared to commit and then rolled back.

The dispatchable status column is shown for completeness, but will be discussed in more detail later. By way of brief explanation, a dispatch unit may be dispatchable (Y), not dispatchable (N), or dispatched (assigned) to thread x (not shown).

Whether or not a dispatch unit is dispatchable depends on whether it is permissible to assign that dispatch unit to a thread for processing at the current time. If a thread is not dispatchable, then the status column indicates why, i.e., upon which data item there is a conflict. For example, T2P cannot be dispatched until the work of T1C1 is completed due to a conflict on data item 1. T1C1 is to insert data item 1, whilst T2P wants to update that data item.

When a dispatch unit is dispatchable it may be assigned to a thread, in which case the status column is updated to indicate which thread the dispatch unit has been assigned to.

Note that, when an assigned thread completes the work of a dispatch unit, the data manager is informed and the list is updated to remove the completed work. Thus, for example, when the work of T1C1 is complete, this dispatch unit will be removed and there will no longer be a conflict on data item 1 for T2P.

The first optimization is to cancel out dispatch units which refer to the same transaction. This optimization can be performed by the dispatcher (preprocessor component) at the time when information about a dispatch unit is to be inserted into table 3. The transaction id index 170 is used to simplify this process.

Figure 4:
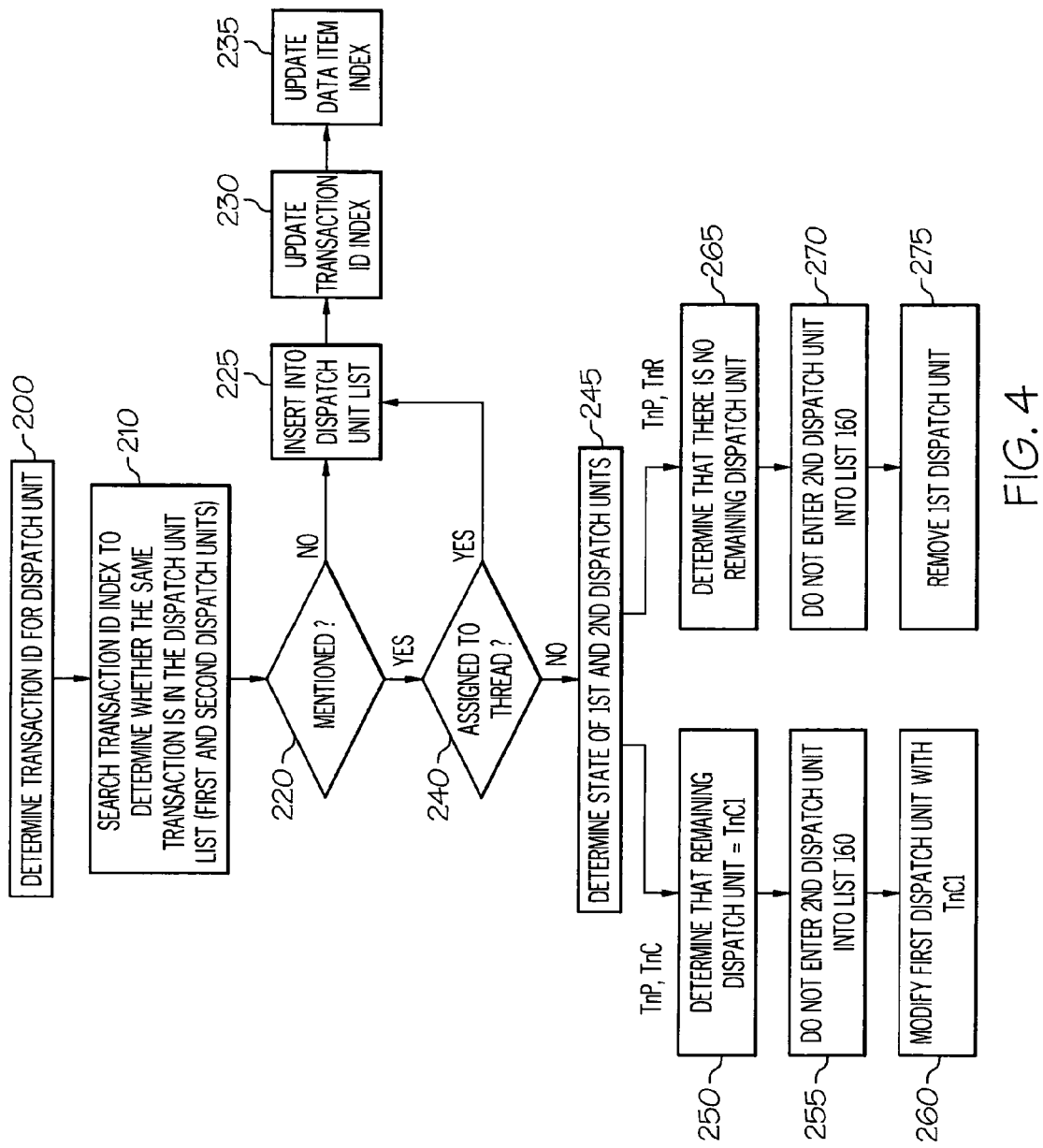
FIG. 4 shows the processing performed when a new dispatch unit is received, in accordance with a preferred embodiment of the present invention.

FIG. 4 illustrates this optimization in accordance with a preferred embodiment of the present invention.

Upon receipt of a dispatch unit, it is determined how the dispatch list 160 should be modified. This is preferably done by determining the unique transaction id for the particular dispatch unit (step 200) and then using this to search the transaction id index (step 210).

If the transaction id cannot be found (step 220), the dispatch list contains no dispatch units for the transaction. If there is an existing dispatch unit for the transaction (step 220), and it has already been assigned to a dispatcher thread (31, 32, 33) (step 240), the existing dispatch unit can no longer be included in this optimization. In both these cases, the dispatch unit is added to the dispatch list 160 and the indices 170 and 180 are updated appropriately (steps 225, 230, 235).

If, however, the transaction is already referred to in the index 170 and the existing dispatch unit (there cannot be more than one) has not yet been assigned to a dispatcher thread (31, 32, 33), then the optimization can be applied. For explanatory purposes this existing dispatch unit is denoted "first dispatch unit". The newly received dispatch unit is denoted "second dispatch unit".

At step 245, the state of the first and second dispatch units is determined. If it is determined that first dispatch unit refers to a transaction moving into the 'prepared to commit' state whilst the second dispatch unit refers to the same transaction moving into the 'committed' state, then it is determined at step 240 that the dispatch units can be combined into a single one, denoted for ease of explanation "remaining dispatch unit," which represents the transaction moving directly from the 'active' state to the 'committed' state, without the intervening 'prepared to commit' state (step 250). This results in the second dispatch unit not being entered into list 160 (step 255) and the first dispatch unit being modified to refer to the remaining dispatch unit (step 260). Thus this optimization is effectively reducing two-phase commit to one-phase commit. This is because the persistent store does not see the 'prepared' state, and therefore fewer interactions are required with the persistent store.

Likewise, if at step 245 it is determined that the first dispatch unit refers to a transaction moving into the 'prepared to commit' state, whilst the second dispatch unit refers to the same transaction moving into the 'rolled back' state, then it is determined that there is no "remaining dispatch unit" to be inserted into the list 160 (step 265). This is because there is no need for the first dispatch unit even to be dispatched due to the subsequent rollback of the transaction. This results in the second dispatch unit not being entered into the list (step 270) and the first dispatch unit being deleted from the list (step 275). This is the degenerate TnR1 case described earlier.

This optimization results in the following sequence of dispatch units:

TABLE 4

| Transaction ID & State | Operation | Operation | Operation | Operation | Operation | Dispatchable? |
|---|---|---|---|---|---|---|
| T1C1 | [I1] |  | [I3] |  |  | Y |
| T2C1 | [U1] | [I2] |  |  |  | N (1) |
| T3C1 |  |  | [U3] | [I4] |  | N (3) |
| T4C1 |  | [U2] |  |  |  | N (2) |
| T5C1 |  |  | [D3] |  |  | N (3) |
| T6C1 |  | [D2] |  | [D4] |  | N (2, 4) |
| T8C1 | [D1] |  |  |  |  | N (1) |

Thus in comparing tables 3 and 4, it can be seen that an entry for T2C1 has replaced T2P and T2C. Further, all reference to transaction T7 have been removed from the dispatch unit list. This has resulted in the removal of in three dispatch units comprising a total of three operations. Note, the removal of dispatch units may necessitate the update of the dispatchable status column.

Figure 5:
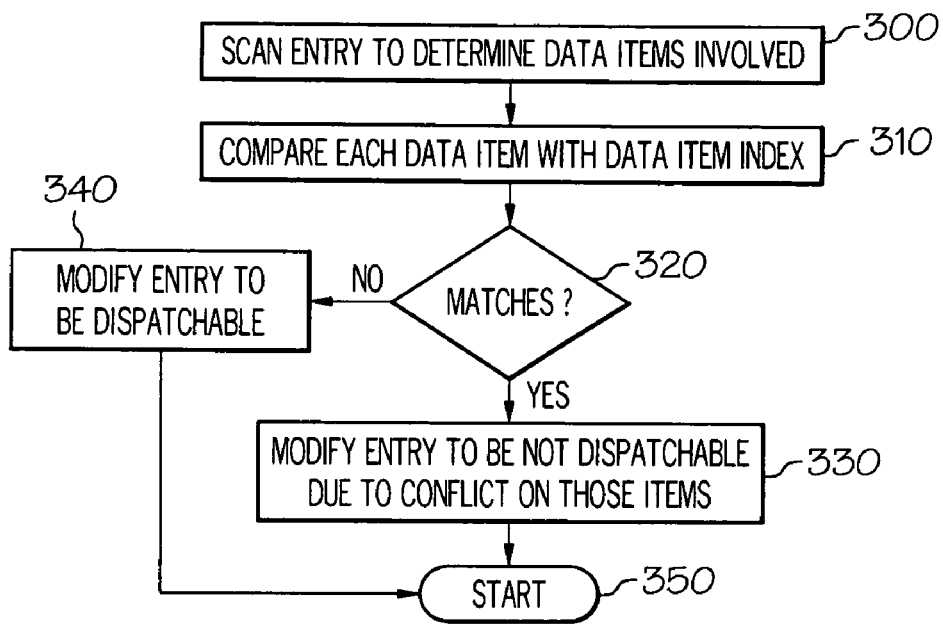
FIG. 5 illustrates the process for determining the dispatchable status of each dispatch unit in accordance with a preferred embodiment of the present invention.

The remaining optimizations require analysis of the operations comprising the dispatch units. The dispatch units are preferably batched by the preprocessor component in order to optimize further. This optimization involves the use of the dispatchable status column. Whilst this column has thus far been briefly mentioned, the processing by which such information is achieved has not yet been discussed. FIG. 5 illustrates the process of determining whether or not a unit is dispatchable. This determination is made for each dispatch unit as it is added to dispatch list 160, and updated as dispatch units are assigned to threads and completed dispatch units are removed from dispatch list 160. The aim here is to ensure that dispatch units which refer to any particular data item are not presented out of order to the persistent store.

Each entry corresponding to information about a dispatch unit is scanned to determine the data items being operated upon (step 300). As previously mentioned, an index 180 is held of all data items appearing in dispatch units in the dispatch list. This index is used when a dispatch unit is added to the dispatch list to determine whether there are any matches of data items in the dispatch unit being added and data items already appearing in the dispatch list (step 310, 320). If there are no matches for the data items in this dispatch unit, then the information about the dispatch unit is modified to indicate that this unit is dispatchable (step 340). The process for this unit then ends (step 350). If, on the other hand, there are matches, then the dispatch unit entry in list 160 is modified to indicate that the unit is not dispatchable due to a conflict on those matched items (step 330). Again the process then ends for that dispatch unit (step 350). It will be appreciated that the first entry in list 160 will always be dispatchable.

A consolidated version of table 4 is now shown in which deleted dispatch units have been removed:

TABLE 5

| Transaction ID & State | Operation | Operation | Operation | Operation | Operation | Dispatchable? |
|---|---|---|---|---|---|---|
| T1C1 | [I1] | | [I3] | | | Y |
| T2C1 | [U1] | [I2] | | | | N (1) |
| T3C1 | | | [U3] | [I4] | | N (3) |
| T4C1 | | [U2] | | | | N (2) |
| T5C1 | | | [D3] | | | N (3) |
| T6C1 | | [D2] | | [D4] | | N (2, 4) |
| T8C1 | [D1] | | | | | N (1) |

Note that the deletion of T2C, T7P and T7R did not necessitate the update of the dispatchable column.

From table 5 above, it can be seen, for example, that T6C1 is not dispatchable due to a conflict on data items 2 and 4. Item 2 is mentioned earlier in the dispatch list as a result of T2C1 which is inserting it and T4C1 which is updating it. Similarly, item 4 is mentioned earlier in the dispatch list as a result of its insertion by T3C1.

The description so far has concerned itself with the creation and optimization of the list of dispatch units. The dispatcher is also responsible for performing the work described by the dispatch units against the persistent store. Whenever the dispatch list contains any dispatch units which are dispatchable, that is, have no conflicts with other dispatch units mentioned earlier in the dispatch list, the dispatcher is able to dispatch work to the dispatcher threads (31, 32, 33) to perform the work against the persistent store. There is no particular requirement to perform this with any particular frequency, although it is best to seek a balance between accumulating sufficient dispatch units to give ample scope for optimizations and timeliness of dispatch to reduce the opportunity of losing volatile information in the event of a system failure.

It may be important to honor the original order of the dispatch units. Reordering is permitted, provided that the order of operations on each individual data item in the persistent store is maintained. In the process of assigning a dispatch unit containing an operation on a particular item, other dispatch units which include operations on the same item can be assigned to the same thread, but not to other threads. Otherwise, concurrent dispatch of the dispatch units might result in the re-ordering of operations on the item and potentially losing all consistency for the data in the persistent store.

Figure 6:
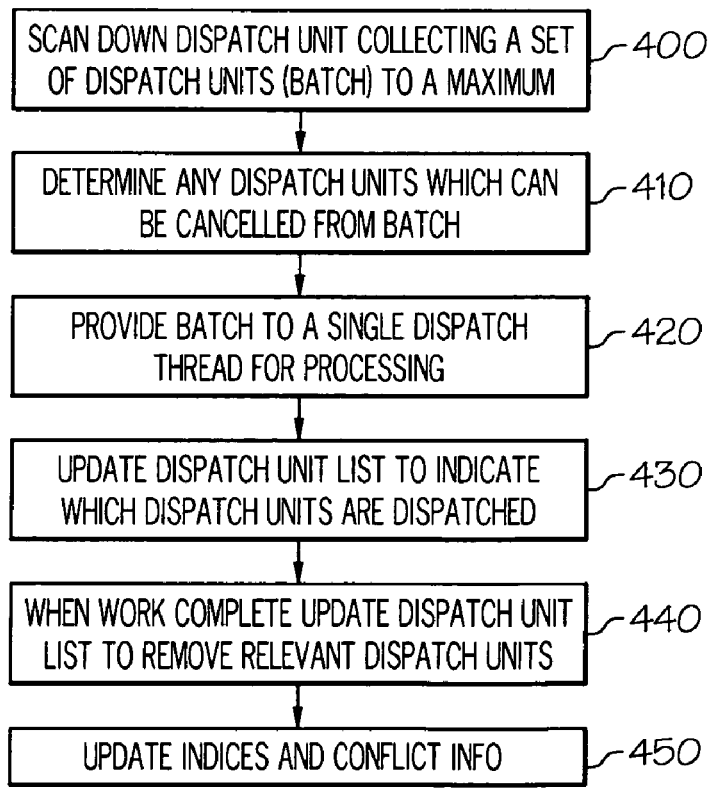
FIG. 6 shows the process for batching dispatch units into groups in accordance with a preferred embodiment of the present invention.

FIG. 6 illustrates the processing involved in accordance with a preferred embodiment of the present invention. The preprocessor component scans down the dispatch unit list 160 collecting together a set of dispatch units referred to as a batch until a maximum is reached (step 400). The batch can contain only dispatch units not already assigned to another dispatch thread, and the dispatch units chosen must be either dispatchable in their own right or conflicting only with other dispatch units already in the batch being constructed. For exemplary purposes, a maximum of three dispatch units per batch is chosen. In practice, the limit may be chosen heuristically or made autonomically self-tuning based on throughput data from the running system.

It is then determined which, if any, dispatch units may be canceled from a batch (step 410). If a batch contains a committed delete of an item, it is possible to omit from the batch all operations on the item except the deletion operation, since the effects of all other operations would be deleted. A further enhancement of the same optimization is that if the batch contains the insertion and committed deletion of any data item, it is possible to omit from the batch all operations on the item, since the item did not exist before the batch and will not exist after the batch.

Once the optimizations have been applied, the batch can be dispatched to the dispatcher thread (31, 32, 33) for which it was built for performance against the persistent store (step 420). Note that the dispatch unit list is updated to indicate which dispatch units have been dispatched (step 430). The dispatcher thread must ensure that the persistent store is updated atomically with the work in the batch to ensure the transactionality guarantees are met.

Once the dispatcher thread has completed work on its batch, the dispatch units in the batch are removed from the dispatch list (step 440) updating the indices and the dispatchability and conflict information for the remaining dispatch units in the list (450).

Using table 5 for exemplary purposes, a first batch is thus created of:

| Batch 1 | | | | |
|---|---|---|---|---|
| Transaction ID & State | Operation | Operation | Operation | Operation |
| T1C1 | [I1] | | [I3] | |
| T2C1 | [U1] | [I2] | | |
| T3C1 | | | [U3] | [I4] |

There are no dispatch units which can be canceled in this batch, and thus no further optimization is possible. If T3C1 had included only operation I5 (i.e. an operation on a piece of data not previously operated upon) then this transaction could have been included in batch 1, but equally would have been dispatchable in its own right.

None of the other dispatch units can be dispatched because they contain operations which affect items touched by the first batch. No concurrent dispatching of further work is possible at this time.

Once the first batch has been written to the persistent store, the list of dispatch units is updated (using the processing of FIG. 5) to look as follows:

TABLE 6

| Transaction ID & State | Operation | Operation | Operation | Operation | Operation | Dispatchable? |
|---|---|---|---|---|---|---|
| T4C1 | | [U2] | | | | Y |
| T5C1 | | | [D3] | | | Y |
| T6C1 | | [D2] | | [D4] | | N (2) |
| T8C1 | [D1] | | | | | Y |

Using the processing of FIG. 6, these can be grouped into two batches:

| Batch 2 | | | | |
|---|---|---|---|---|
| Transaction ID & State | Operation | Operation | Operation | Operation |
| T4C1 | | | | |
| T5C1 | | | [D3] | |
| T6C1 | | [D2] | | [D4] |

It can be seen that step 410 of FIG. 6 has resulted in the cancellation of operation U2 in T4C1. This is because there is no point in updating data item 2 when T6C1 deletes that data item. One operation has therefore been removed and does not require any update to the persistent store. Note that, if a delete is in the prepared state, it may roll back and thus it cannot be assumed that the delete will happen. The delete on item two is however committed and thus it is safe to remove T4C1. Note that, rather than removing whole transactions, it is also possible to remove individual operations. For example, even if T4C1 had included other non-removable operations, U2 should still preferably be deleted.

Batch 3 is shown below:

| Batch 3 | | | | |
|---|---|---|---|---|
| Transaction ID & State | Operation | Operation | Operation | Operation |
| T8C1 | [D1] | | | |

Batches 2 and 3 can be processed concurrently since they do not refer to common data items.

To summarize, the manipulations performed by the preprocessing component are as follows:

1) Remove redundant operations;
2) Batch the dispatch units together to allow a smaller number of larger interactions with the persistent store;
3) If more than one dispatch unit for a batch is associated with the same transaction, the dispatch units can be combined into a single dispatch unit, provided that the first dispatch unit has not already been assigned to a dispatcher thread (FIG. 4);
4) If the batch contains an operation to commit the deletion of the persistent representation of an item, any other operations in the same batch that refer to the same item can be omitted since their effects would not be seen (step 410); and
5) If the batch contains an operation to commit the insertion of the persistent representation of an item and also an operation to commit the deletion of the persistent representation of an item, all operations in the batch that refer to the same item can be omitted (step 410).

Consider also the effect on the minimum number of separate synchronous disk writes needed with and without the optimizations of the preferred embodiment. For the unoptimised case, it would be necessary to perform 10 interactions with the persistent store, resulting in at least 5 synchronous disk writes, overlapping as many of the dispatch units as possible. For the optimized case using the example of a maximum batch size of three dispatch units, only three interactions with the persistent store are necessary, resulting in as few as two synchronous disk writes, overlapping the second and third batches. This illustrates the tradeoff between data integrity and throughput.

Thus by performing the persistent store updates asynchronously, batching the operations together to reduce the number of interactions required and processing the set of operations to remove unnecessary work, it is possible to improve the throughput of a system considerably, especially if the data items tend to be short-lived.

Note that the persistent store could be a database and the data-processing system a messaging system. There are other options also since a database could be built on top of a transactional file system, and so on.

As discussed above, by loosening transactional semantics and completing each transaction's operations against the persistent store asynchronously, both the number of interactions and also the amount of data that needs to be transferred to the persistent store can be reduced. However, there is a risk that entire (but not partial) transactions may be lost in the case of failures. Nevertheless, depending on the type of data being processed by the system, this is a risk that a user may be willing to accept in order to improve the throughput of the system. This may depend on the importance of the data.

What is claimed is:

1. A method for reducing the number of operations performed by a persistence manager against a persistent store of data items, the method comprising:
   receiving a plurality of requests from an application;
   mapping each request into a transaction for performance against the persistent store, each transaction comprising at least one operation;
   accumulating a plurality of transactions; and
   preprocessing the plurality of transactions to reduce the number of operations for performance against the persistent store, wherein preprocessing the plurality of transactions comprises:
      maintaining a list of dispatch units, each dispatch unit containing information about each transaction, including state information; and
      using the list of dispatch units to determine which transaction state changes can be omitted.

2. The method of claim 1, further comprising:
   determining how the omission of a transaction state change affects the transaction; and
   modifying the transaction in accordance with the determination.

3. The method of claim 1, further comprising:
   determining which of said plurality of dispatch units may be batched together; and
   batching dispatch units in accordance with said determination.

4. The method of claim 3, wherein dispatch units up to a maximum are included in each batch.

5. The method of claim 3, further comprising:
   determining whether a dispatch unit is dispatchable; and
   including dispatchable dispatch units in a batch.

6. The method of claim 3, further comprising:
   determining that a dispatch unit is not dispatchable due to a data item conflict, wherein the data item conflict is a result of a dispatch unit already in a batch under construction; and
   including the dispatch unit in the batch under construction.

7. The method of claim 1, further comprising:
   analyzing a batch comprising a plurality of dispatch units;
   using the analysis to determine which operations may be canceled from said batch; and
   canceling any such operations.

8. The method of claim 7, wherein using the analysis comprises determining that a complete dispatch unit may be canceled from said batch.

9. The method of claim 1, further comprising dispatching dispatch units to the persistence manager for performance against the persistent store.

* * * * *